(12) United States Patent
Huang

(10) Patent No.: US 9,537,432 B2
(45) Date of Patent: Jan. 3, 2017

(54) POWER-OFF BRAKE CIRCUIT FOR DC FAN

(71) Applicant: ASIA VITAL COMPONENTS CO., LTD., New Taipei (TW)

(72) Inventor: Po-Sheng Huang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 196 days.

(21) Appl. No.: 14/571,302

(22) Filed: Dec. 16, 2014

(65) Prior Publication Data

US 2016/0149521 A1   May 26, 2016

(30) Foreign Application Priority Data

Nov. 21, 2014   (TW) .............................. 103220697 U

(51) Int. Cl.
 *H02P 3/12* (2006.01)
 *H02P 3/00* (2006.01)

(52) U.S. Cl.
 CPC ..................... *H02P 3/12* (2013.01)

(58) Field of Classification Search
 USPC ................. 318/400.28, 400.29, 293, 294
 See application file for complete search history.

(56) References Cited

U.S. PATENT DOCUMENTS 5,744,922 A * 4/1998 Neary ................. H02P 8/12
                                                   15/175
6,943,514 B1 * 9/2005 Chen ................. H02P 7/29
                                                   318/400.09

* cited by examiner

*Primary Examiner* — Eduardo Colon Santana
*Assistant Examiner* — Iftekhar Mustafa
(74) *Attorney, Agent, or Firm* — C. G. Mersereau; Nikolai & Mersereau, P.A.

(57) ABSTRACT

The present invention relates to a power-off brake circuit for a DC fan, which comprises a control unit, a motor driver unit, a switch unit, a power-off protection unit, and a brake unit and a brake unit. The control unit is coupled to the motor driver unit, the switch unit, the power-off protection unit. The brake unit is coupled to the motor driver unit and the power-off protection unit. By means of the circuit design of the present invention, the independent brake loop is used to achieve the effects of power-off brake and of the accurate control of rotating speed is improved.

7 Claims, 3 Drawing Sheets

POWER-OFF BRAKE CIRCUIT FOR DC FAN

This application claims the priority benefit of Taiwan patent application number 103220697 filed on Nov. 21, 2014.

BACKGROUND OF THE INVENTION

Field of the Invention

The present invention relates to a circuit for a DC fan and in particular to a power-off brake circuit for a DC fan, which achieves the effect of power-off brake by means of an independent brake loop and effectively improves the accurate control of rotating speed.

Description of Prior Art

In many customer products, the fan is a main heat-dissipation tool. When the temperature of a system is too high, the fan will operate to reduce the temperature of the whole system to achieve the effect of heat dissipation. When the temperature of the system decreases to a specific value, the fan will stop operating.

In the traditional design, to prevent the whole system from burning up due to excessive temperature, the system is usually equipped with a cooling fan for protection. However, the requirement of rotating speed of the fan is getting stricter to effectively dissipate the heat generated by the increasing complex devices. Thus, after the fan powers off, the fan still keeps rotating for a period of time and then stops totally.

As for the traditional power-off brake technology for the DC fan, it uses an H-bridge of the motor driver circuit in a capacitive energy storage device such that when power-off occurs, two PMOS transistors on upper arm of the H-bridge or two NMOS transistors on the lower arm of the H-bridge are conducted to make two ends of the motor coil connected to the H-bridge be shorted, resulting in no change in the magnetic poles of the motor and thus the braking effect. Though the fan can be braked using the above traditional technology, it incurs another problem which is that the MOS transistors (e.g., NMOS transistors or PMOS transistors) used in the actuation of power-off brake in the fan are common to those (i.e., two PMOS transistor on the upper arm or two NMOS transistors on the lower arm) used in the H-bridge of the motor driver circuit in the fan. For the traditional fan to control the rotating speed or brake, it needs to use a front driver to control the actuation of the PMOS transistors on the upper arm of the H-bridge and the NMOS transistors on the lower arm of the H-bridge, but such a control method will cause signal distortion during the PMOS transistors in PWM (pulse width modulation) width chopping process and fail to achieve accurate control of rotating speed. Also, the signal distortion can cause a low-voltage-turn-on problem regarding MOS transistors and generate waste heat, which results in a temperature increase in the devices.

Therefore, how to overcome the above problems and disadvantages is the focus which the inventor and the related manufacturers in this industry have been devoting themselves to.

SUMMARY OF THE INVENTION

Thus, to effectively overcome the above shortcomings, one main objective of the present invention is to provide a power-off brake circuit for a DC fan, which achieves the effect of power-off brake by means of an independent brake loop and effectively improves the accurate control of rotating speed.

To achieve the above objective, the present invention provides a power-off brake circuit for a DC fan, which comprises a control unit, a motor driver unit, a switch unit, a power-off protection unit, and a brake unit. The control unit is coupled to an operating voltage. The motor driver unit is coupled to the control unit, an input power source, and at least two ends of a motor coil. The power-off protection unit has a first end, a second end, and a third end. The first end of the power-off protection unit is coupled to the switch unit and the control unit. The second end of the power-off protection unit is coupled to the operating voltage. The third end of the power-off protection unit is coupled to the input power source. The brake unit has a first end, a second end, and a third end. The first end of the brake unit is coupled to the third end of the power-off protection unit. The second end of the brake unit is coupled to any end of the motor coil. The third end of the brake unit is coupled to a ground such that the second end of the brake unit, the any end of the motor coil, and the ground form a brake loop for braking. When the DC fan powers off, the power-off protection unit does not receive the operating voltage and is not conducted with the switch unit in a switch-off state and the brake unit is actuated to brake. By means of the circuit design of the present invention, the independent brake loop is used to achieve the effects of power-off brake and the accurate control of rotating speed is improved.

DETAILED DESCRIPTION OF THE INVENTION

Figure 1:
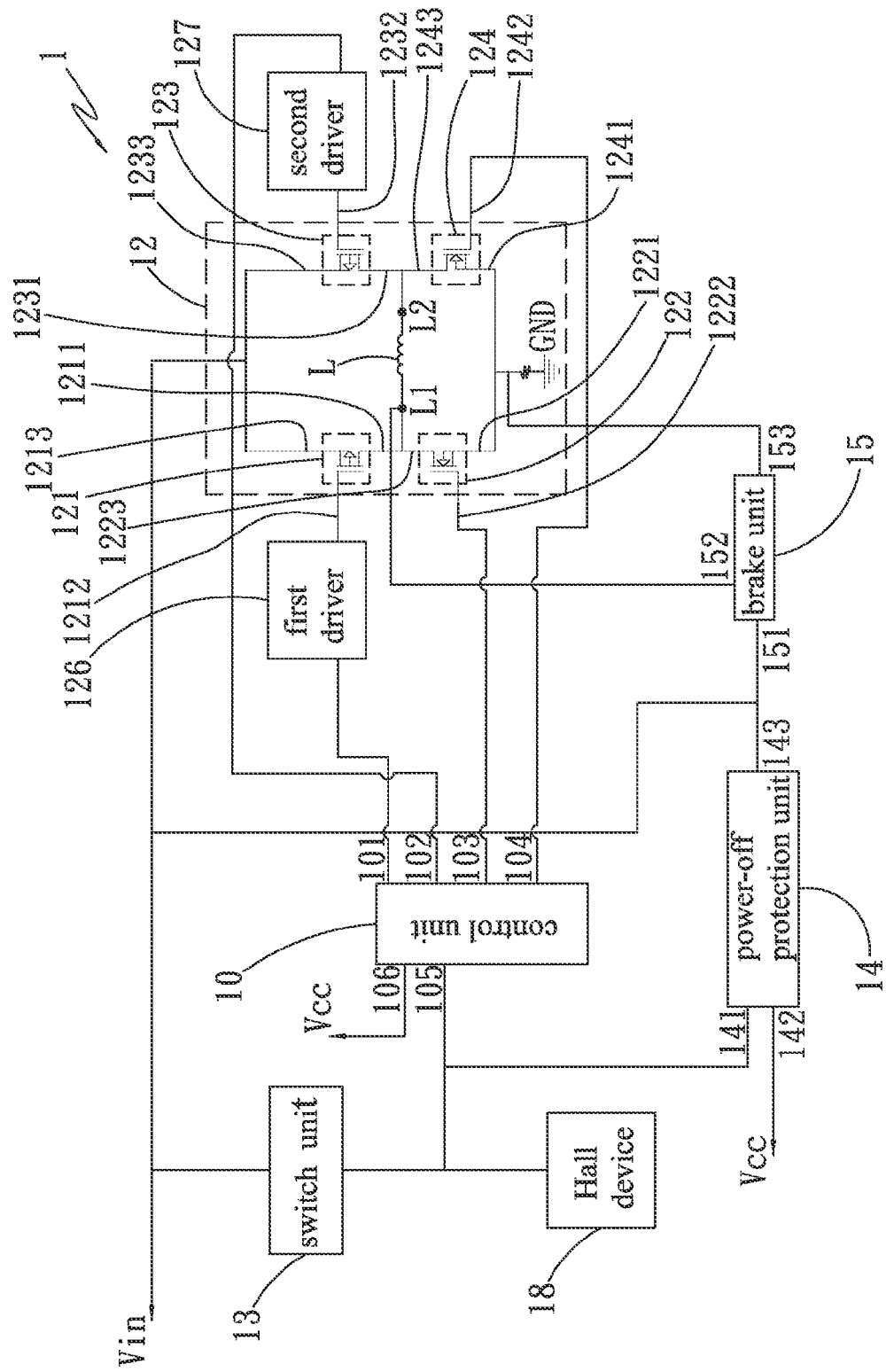
FIG. 1 is a block diagram according to the first preferred embodiment of the present invention.

The above objective of the present invention and the features of structure and function of the present invention are described according to the preferred embodiments in accompanying figures.

The present invention provides a power-off brake circuit for a DC fan. Please refer to FIGS. 1 and 2, which show a block diagram and a brake loop path schematic according to the first preferred embodiment of the present invention, respectively. The power-off brake circuit for a DC fan 1 is applied in a fan (not shown). A single-phase brushless motor is used as an example of the fan in the current preferred embodiment, but not limited to this. In practical embodiments, the fan can be a three-phase or multi-phase brushless motor. For example, a three-phase brushless motor has three motor coil sets, and so on.

The above-mentioned power-off brake circuit for a DC fan 1 comprises a control unit 10, a motor driver unit 12, a switch unit 13, a power-off protection unit 14, a Hall device 18, and a brake unit 15. The motor driver unit 12 is coupled to (or electrically connected to) the control unit 10, an input power source Vin, and at least two ends of a motor coil L. A first end L1 and a second end L2 are used as the motor coil L for explanation in the preferred embodiment, but not limited to this. In practical embodiments, the number of ends of the motor coil L corresponds to the phase number of the fan motor (for example, a three-phase or multi-phase brushless motor). The switch unit 13 is coupled to the control unit 10 and the input power source Vin (e.g., a 12-volt or 48-volt power source). The motor driver unit 12 has a first switch 121, a second switch 122, a third switch 123, a fourth switch 124, a first driver 126, and a second driver 127. Each of the first switch 121, the second switch 122, the third switch 123, and the fourth switch 124 has a first end 1211, 1221, 1231, 1241, a second end 1212, 1222, 1232, 1242, and a third end 1213, 1232, 1233, 1243. The first end 1211 of the first switch 121 is coupled to the third end 1223 of the second switch 122 and the first end L1 of the motor coil L. The first end 1231 of the third switch 123 is coupled to the third end 1243 of the fourth switch 124 and the second end L2 of the motor coil L. The third ends 1213, 1233 of the first switch 121 and the third switch 123 are coupled to the input power source Vin. The first ends 1221, 1241 of the second switch 122 and the fourth switch 124 are coupled to the ground GND. The second ends 1222, 1242 of the second switch 122 and the fourth switch 124 are coupled to the control unit 10. One end of each of the first driver 126 and the second driver 127 is coupled to the second ends 1212, 1232 of the first switch 121 and the third switch 123, respectively; the other end of each of the first driver 126 and the second driver 127 is coupled to the control unit 10. In the current preferred embodiment, PMOS transistors are used as examples of the first switch 121 and the third switch 123, and NMOS transistors are used as examples of the second switch 122 and the fourth switch 124, but not limited to these.

In the current preferred embodiment, a micro control unit (MCU) is used as an example of the control unit 10, but not limited to this. The control unit 10 has a plurality of terminals. A first terminal 101 of the control unit 10 is coupled to the other end of the first driver 126. A second terminal 102 of the control unit 10 is coupled to (or electrically connected to) the other end of the second driver 127. A third terminal 103 and a fourth terminal 104 of the control unit 10 are coupled to the second ends 1222, 1242 of the second switch 122 and the fourth switch 124, respectively. A fifth terminal 105 of the control unit 10 is coupled to the first end 141 of the power-off protection unit 14 and one end of the switch unit 13. A sixth terminal 106 of the control unit 10 is coupled to the operating voltage Vcc (e.g., a 5-volt operating voltage).

Figure 2:
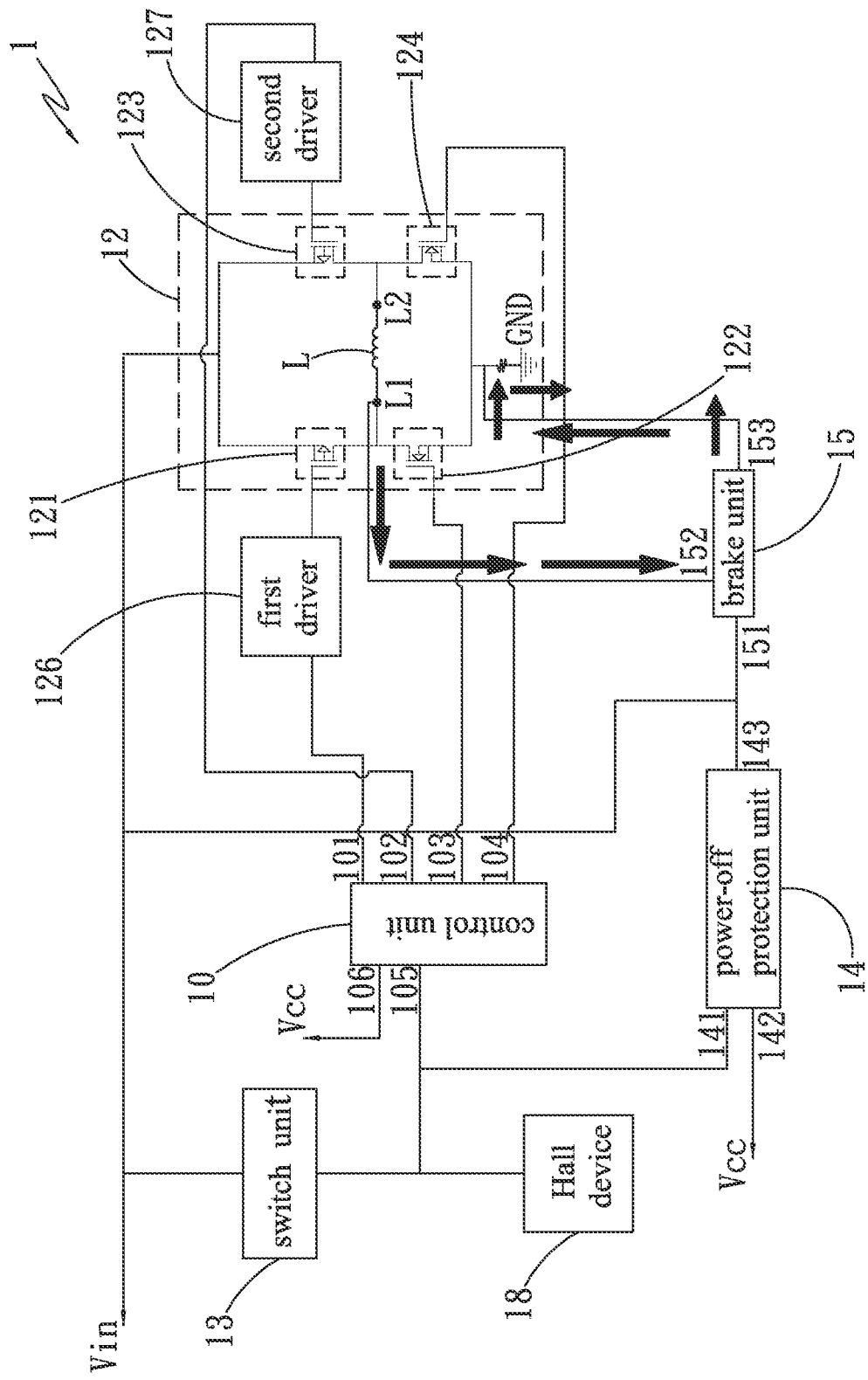
FIG. 2 is a brake loop path schematic according to the first preferred embodiment of the present invention.

Please continue to refer to FIG. 1. The power-off protection unit 14 has the above-mentioned first end 141, a second end 142, and a third end 143. The first end 141 of the power-off protection unit 14 is coupled to one end of the switch unit 13 and the fifth terminal 105 of the control unit 10. The second end 142 of the power-off protection unit 14 is coupled to the operating voltage Vcc. The third end 143 of the power-off protection unit 14 is coupled to the input power source Vin and the third ends 1213, 1233 of the first switch 121 and the third switch 123. As the switch unit 13 receives the input power source Vin, the power-off protection unit 14 is in a switch-on state and further receives the operating voltage Vcc and is conducted or as the switch unit 13 receives the input power source Vin, the power-off protection unit 14 is in a switch-off state and further does not receive the operating voltage Vcc and is not conducted. The power-off protection unit 14 is used to stop and disable the brake operation to protect the fan from burning up due to vertical conduction. The Hall device 18 is electrically coupled to the fifth terminal 105 of the control unit 10 and the first end 141 of the power-off protection unit 14 to send a Hall signal to the control unit 10.

The brake unit 15 has a first end 151, a second end 152, and a third end 153. The first end 151 of the brake unit 15 is coupled to the third end 143 of the power-off protection unit 14. The second end 152 of the brake unit 15 is coupled to one end of the motor coil L. In a preferred embodiment, the motor coil L has the first end L1 and the second end L2; the second end 152 of the brake unit 15 electrically connected to the first end L1 of the motor coil L is used as an example for explanation, but not limited to this. In practical embodiments, the second end 152 of the brake unit 15 can also be electrically connected to the second end L2 of the motor coil L. The third end 153 of the brake unit 15 is coupled to the ground GND such that the second end 152 of the brake unit 15, the first end L1 of the motor coil L, and the ground GND form a brake loop (refer to bold arrows in FIG. 2) for braking. Namely, the second end 152 and the third end 153 of the brake unit 15 and the first end L1 of the motor coil L form a one-way closed loop such that the positive charges at the first end L1 of the motor coil L will rapidly flow to the GND (as the bold arrows in FIG. 2) and the magnetic poles of the motor (i.e., the voltage at the motor coil L) will not change to achieve the braking effect.

Therefore, in the present invention, by means of the separation between the independent brake unit 15 and the motor driver unit 12 used to rotate the fan, the brake unit 15 will not share the above switches (i.e., the first, second, third, and fourth switches 121, 122, 123, 124) of the motor driver unit 12, which enables the control unit 10 to directly perform the PWM width chopping control of the switches (i.e., the second and fourth switches) on the lower arm of the motor driver unit 12 without the front driver to control the switches on the lower arm of the motor driver unit 12. As a result, the signal distortion problem caused during PWM chopping can be effectively improved and the accurate control of rotating speed of the fan can be achieved.

When the fan powers on, the switch unit 13 receives the input power source Vin and is in the switch-on state and the power-off protection unit 14 receives the operating voltage Vcc (i.e., the power-off protection unit 14 is switched on by the operating voltage Vcc) and is actuated (or conducted). Meanwhile, the brake unit 15 is switched off to release (or stop) braking (i.e., the brake unit 15 is not actuated) such that the control unit 10 returns to normal operation and controls the motor driver unit 12 to rotate the fan. When the fan powers off, the switch unit 13 does not receive the input power source Vin and is in the switch-off state and the operating voltage Vcc drops rapidly to zero volt. Meanwhile, the power-off protection unit 14 does not receive the operating voltage Vcc (i.e., the power-off protection unit 14 is switched on by the operating voltage Vcc) and is switched off (or not conducted). The stored energy at the first end L1 of the motor coil L will make the brake unit 15 actuated and conducted. Further, the positive charges at the first end L1 of the motor coil L will rapidly flow to the ground GND through the brake loop such that the magnetic poles of the motor (i.e., the voltage at the motor coil L) does not change and achieve the braking effect.

Therefore, by means of the design of the power-off brake circuit for the DC fan of the present invention, the effects of power-off brake by an independent brake loop and improvement of accurate control of rotating speed can be achieved.

Figure 3:
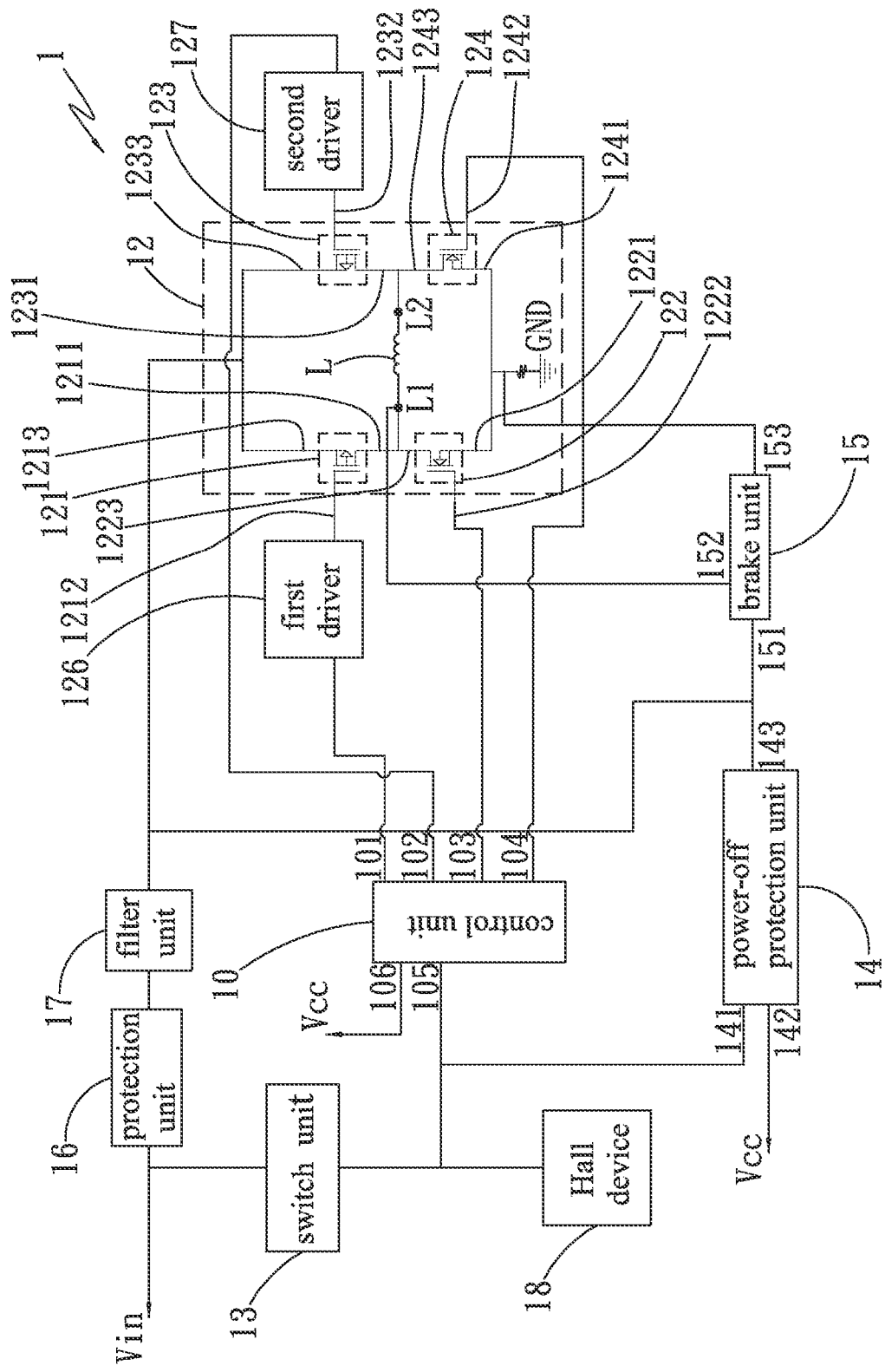
FIG. 3 is a block diagram according to the second preferred embodiment of the present invention.

Please refer to FIG. 3, which is a block diagram according to the second preferred embodiment of the present invention. Please also refer to FIG. 2. The structure, configuration, and function of the circuit of the second preferred embodiment and the functions thereof are similar to those of the first one and will not be described here again. The difference is that in the second preferred embodiment, the power-off brake circuit for the DC fan 1 further comprises a protection unit 16 and a filter unit 17. A diode is used as an example of the protection unit 16 and a capacitive device is used as an example of the filter unit 17 in the current preferred embodiment, but not limited to these. One end of the protection unit 16 is electrically coupled to the input power source Vin and one end of the switch unit 13; the other end of the protection unit 16 is electrically coupled to one end of the filter unit 17; the other end of the filter unit 17 is electrically coupled to the first end 151 of the brake unit 15, the third end 1213 of the first switch 121, and the third end 143 of the power-off protection unit 14.

The protection unit 16 is used to block the discharging voltage of the filter unit 17 to prevent the operations of other units from being affected. The filter unit 17 is used to provide energy to switch on the brake unit 15. That is, when the fan powers off, the residual energy stored in the filter unit 17 is provided for the brake unit 15 to make the brake unit 15 actuated and conducted. Further, the positive charges at the first end L1 of the motor coil L can rapidly flow to the GND and the magnetic poles of the motor (i.e., the voltage at the motor coil L) will not change to achieve the braking effect.

Therefore, by means of the design of the power-off brake circuit for the DC fan of the present invention, the effects of power-off brake by an independent brake loop and improvement of accurate control of rotating speed can be achieved.

Compared with the traditional design, the present invention has the following advantages,
1. The independent brake unit and the motor driver unit during the fan operation are separated from each other in which the brake unit does not share the switches of the motor driver unit such that when the fan powers off, the power-off brake effect is achieved by the independent brake loop.
2. The signal distortion problem caused during PWM chopping can be effectively improved.
3. The accurate control of rotating speed of the fan can be achieved.

It will be understood that the above description is only about some preferred embodiments. All variations regarding the above method, shape, structure, and device according to the claimed scope of the present invention should be embraced by the scope of the appended claims of the present invention.

What is claimed is:
1. A power-off brake circuit for a DC fan, comprising:
a control unit coupled to an operating voltage;
a motor driver unit coupled to the control unit, an input power source, and at least two ends of a motor coil;
a switch unit coupled to the control unit and the input power source;
a power-off protection unit having a first end, a second end, and a third end, wherein the first end of the power-off protection unit is coupled to the switch unit and the control unit, wherein the second end of the power-off protection unit is coupled to the operating voltage, wherein the third end of the power-off protection unit is coupled to the input power source; and
a brake unit having a first end, a second end, and a third end, wherein the first end of the brake unit is coupled to the third end of the power-off protection unit, wherein the second end of the brake unit is coupled to one end of the motor coil, wherein the third end of the brake unit is coupled to a ground such that the second end of the brake unit, one end of the motor coil, and the ground form a brake loop for braking;
wherein when the DC fan powers on, the power-off protection unit receives the operating voltage and is conducted with the switch unit in a switch-on state and the brake unit is switched off,
wherein when the DC fan powers off, the power-off protection unit does not receive the operating voltage and is not conducted with the switch unit in a switch-off state and the brake unit is actuated to brake.

2. The power-off brake circuit for the DC fan according to claim 1, wherein the motor driver unit has a first switch, a second switch, a third switch, a fourth switch, a first driver, and a second driver, wherein each of the first switch, the second switch, the third switch, and the fourth switch has a first end, a second end, and a third end, wherein the first end of the first switch is coupled to the third end of the second switch and a first end of the motor coil, wherein the first end of the third switch is coupled to the third end of the fourth switch and a second end of the motor coil, wherein the third ends of the first switch and the third switch are coupled to the input power source, wherein the first ends of the second switch and the fourth switch are coupled to the ground, wherein the second ends of the second switch and the fourth switch are coupled to the control unit, wherein one end of each of the first driver and the second driver is coupled to the second ends of the first switch and the third switch, respectively, wherein the other end of each of the first driver and the second driver is coupled to the control unit.

3. The power-off brake circuit for the DC fan according to claim 2, wherein the first end of the power-off protection unit is coupled to the control unit and one end of the switch unit, wherein the third end of the power-off protection unit is coupled to the input power source and the third ends of the first switch and the third switch.

4. The power-off brake circuit for the DC fan according to claim 3, wherein the control unit has a plurality of terminals, wherein a first terminal of the control unit is coupled to the other end of the first driver, wherein a second terminal of the control unit is coupled to the other end of the second driver, wherein a third terminal and a fourth terminal of the control unit are coupled to the second ends of the second switch and the fourth switch, wherein a fifth terminal of the control unit is coupled to the first end of the power-off protection unit and one end of the switch unit, wherein a sixth terminal of the control unit is coupled to the operating voltage.

5. The power-off brake circuit for the DC fan according to claim 2, further comprising a protection unit and a filter unit, wherein one end of the protection unit is electrically coupled to the input power source and one end of the switch unit, wherein the other end of the protection unit is electrically coupled to one end of the filter unit, wherein the other end of the filter unit is electrically coupled to the first end of the brake unit and the third end of the first switch.

6. The power-off brake circuit for the DC fan according to claim 5, further comprising a Hall device which is electrically coupled to the fifth terminal of the control unit and the first end of the power-off protection unit.

7. The power-off brake circuit for the DC fan according to claim 1, wherein the first switch and the third switch are PMOS transistors, wherein the second switch and the fourth switch are NMOS transistors.

* * * * *